I. KOECHLIN.
MOTOR ROAD VEHICLE FOR SEARCH LIGHT AND THE LIKE OPERATIONS.
APPLICATION FILED APR. 30, 1914.
1,175,064.
Patented Mar. 14, 1916.
2 SHEETS—SHEET 1.
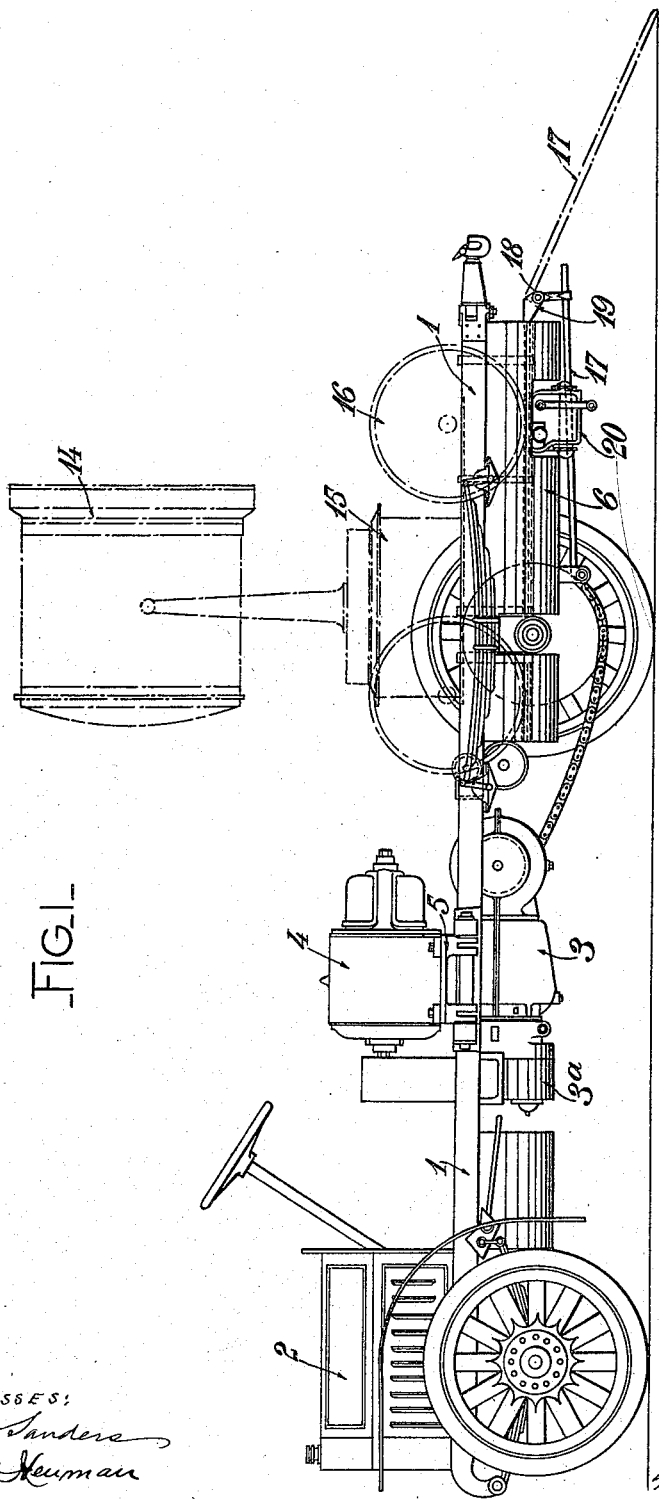

I. KOECHLIN.
MOTOR ROAD VEHICLE FOR SEARCH LIGHT AND THE LIKE OPERATIONS.
APPLICATION FILED APR. 30, 1914.
1,175,064.
Patented Mar. 14, 1916.
2 SHEETS—SHEET 2.
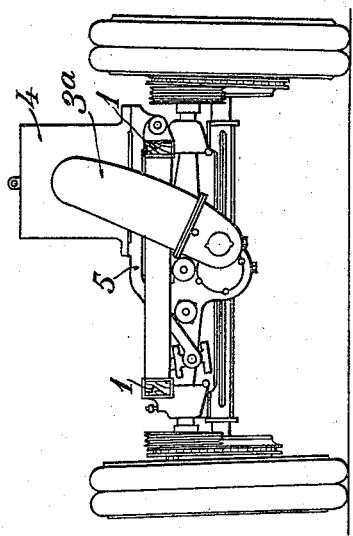
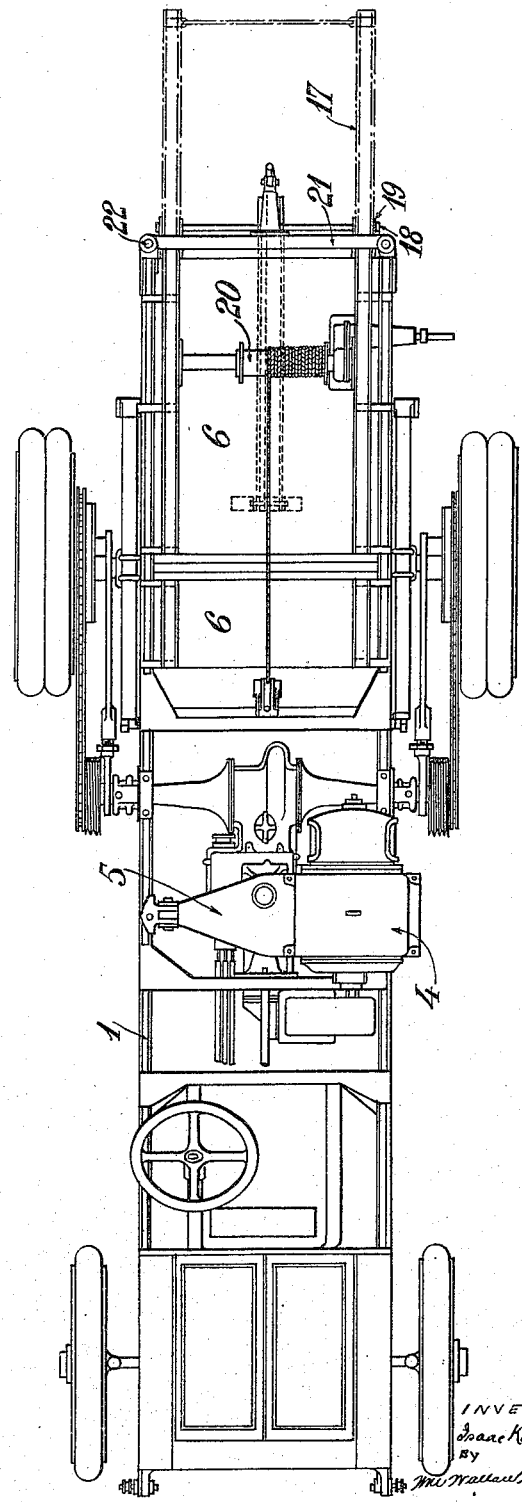

UNITED STATES PATENT OFFICE.

ISAAC KOECHLIN, OF LEVALLOIS-PERRET, FRANCE, ASSIGNOR TO SOCIETE ANONYME DES AUTOMOBILES ET CYCLES PEUGEOT, OF PARIS, FRANCE.

MOTOR ROAD-VEHICLE FOR SEARCH-LIGHT AND THE LIKE OPERATIONS.

1,175,064. Specification of Letters Patent. Patented Mar. 14, 1916.

Application filed April 30, 1914. Serial No. 835,414.

*To all whom it may concern:*

Be it known that I, ISAAC KOECHLIN, citizen of Switzerland, residing at 71 Rue Danton, Levallois-Perret, Seine, in the Republic of France, have invented new and useful Improvements in Motor Road-Vehicles for Search-Light and the like Operations of which the following is a specification.

This invention relates to improvements in motor road vehicles for search-light and the like operations, and provided with a removable electric projector. The vehicle comprises the usual motor frame provided with an electric projector fed by a dynamo which is carried by the frame and can be driven by the motor.

According to the invention the carriage supporting the projector is supported by the motor chassis by means of a cradle to which rails are connected which can be used to run the projector carriage on to the vehicle or to run it off the same.

In the annexed drawings, which show a form of construction of the invention by way of example, Figure 1 is an elevation, Fig. 2 a plan, and Fig. 3 a vertical transverse section of a motor chassis having an electric projector provided with a cradle and arranged according to the invention.

The usual motor chassis 1 comprises besides the motor 2 and the speed change gear box 3 a dust-tight casing 3ª containing the chain and the transmission gear wheels for driving a dynamo 4 which feeds the search-light or projector 14. The dynamo is mounted on a pivoted base 5 which allows of adjusting the tension of its chain. The chassis also carries a reel for the electric wire which connects the dynamo to the projector. At the back of the chassis a metal cradle 6 is arranged fixed to the side bars 1 of the chassis. On this cradle the wheels 16 of the carriage 15, carrying the projector, can run. The cradle is extended rearward by two removable inclined rails 17, the hook shaped upper ends 18 of which engage on two supports 19 of the cradle; 20 is a non-reversing winch for raising or lowering the carriage 15 on the rails 17; 21 is the rear cross bar of the frame 1 pivoted at 22 on the side bar so that it can be turned aside to allow the projector carriage 15 to pass. In the normal position the rails 17 are unmounted from the cradle and placed on hooks below the vehicle, as shown in full lines.

The projector 14 can be used when it rests on the cradle 6 of the car frame, but if for any reason, for example owing to the nature of the ground, the car cannot be brought to the place where the projector should be placed, the same can be lowered from the cradle by placing the rails in the position shown in dotted lines while operating the winch 20; the projector is then taken to the desired point while allowing the electric cable which connects it to the dynamo to unwind. The reverse operations, equally simple and rapid, permit of again mounting the projector on the car frame.

Having now described my invention, what I claim as new and desire to secure by Letters Patent is:

A motor road vehicle comprising in combination a cradle mounted on the side bars of the vehicle frame, a carriage adapted to run on said cradle, an electric projector supported on said carriage, removable rails adapted to be placed in an inclined position at the back of the cradle and provided at one end with hooks, supports provided at the end of the vehicle frame to receive the hooked ends of the rails, and other supports and hooks provided below the vehicle to receive the rails in the normal unmounted position, substantially as described and for the purpose set forth.

In testimony whereof I have signed my name to this specification in the presence of two subscribing witnesses.

ISAAC KOECHLIN.

Witnesses:
CHAS. P. PIMLY,
LOUIS MOSES.